United States Patent
Wodzianek

(10) Patent No.: US 7,600,013 B2
(45) Date of Patent: Oct. 6, 2009

(54) SYSTEM AND METHOD FOR REMOTELY MONITORING MODEM STATUS

(75) Inventor: Richard Wodzianek, Coquitlam (CA)

(73) Assignee: Sierra Wireless, Inc., Richmond, BC (CA)

(*) Notice: Subject to any disclaimer, the term of this patent is extended or adjusted under 35 U.S.C. 154(b) by 641 days.

(21) Appl. No.: 09/919,069

(22) Filed: Jul. 30, 2001

(65) Prior Publication Data
US 2003/0023720 A1 Jan. 30, 2003

(51) Int. Cl.
G06F 15/173 (2006.01)
G06F 15/16 (2006.01)

(52) U.S. Cl. ............................ 709/224; 709/250
(58) Field of Classification Search .................. None
See application file for complete search history.

(56) References Cited

U.S. PATENT DOCUMENTS

| | | | |
|---|---|---|---|
| 4,385,384 A | | 5/1983 | Rosbury et al. |
| 5,742,639 A * | | 4/1998 | Fasulo et al. ............... 375/219 |
| 6,138,002 A * | | 10/2000 | Alperovich et al. ......... 455/407 |
| 6,151,355 A | | 11/2000 | Vallee et al. |
| 6,223,026 B1 * | | 4/2001 | Martschitsch ............... 455/407 |
| 6,330,597 B2 * | | 12/2001 | Collin et al. ................ 709/220 |
| 6,335,927 B1 * | | 1/2002 | Elliott et al. ................ 370/352 |
| 6,430,409 B1 * | | 8/2002 | Rossmann ................ 455/422.1 |
| 6,477,150 B1 * | | 11/2002 | Maggenti et al. ............ 370/312 |
| 6,584,490 B1 * | | 6/2003 | Schuster et al. ............. 709/200 |
| 6,587,441 B1 * | | 7/2003 | Urban et al. ................ 370/310 |
| 6,587,691 B1 * | | 7/2003 | Granstam et al. ......... 455/456.1 |
| 6,640,248 B1 * | | 10/2003 | Jorgensen .................. 709/226 |
| 6,658,010 B1 * | | 12/2003 | Enns et al. .................. 370/401 |
| 6,680,922 B1 * | | 1/2004 | Jorgensen .................. 370/328 |
| 6,717,938 B1 * | | 4/2004 | D'Angelo ................... 370/352 |
| 6,898,618 B1 * | | 5/2005 | Slaughter et al. ............ 709/203 |
| 7,221,961 B1 * | | 5/2007 | Fukumoto et al. ........... 455/557 |

FOREIGN PATENT DOCUMENTS

WO    WO 99/45694    9/1999

OTHER PUBLICATIONS

G. Epenoy et al., "*Dynamic Setting of Modem Parameters*", IBM Technical Disclosure Bulltetin, Jun. 1983, vol. 26, No. 1, pp. 1-2.
PCT International Search Report, PCT/CA 02/01195, International filing date Jul. 30, 2002, date Search Report mailed Apr. 4, 2003.

* cited by examiner

*Primary Examiner*—John B. Walsh
(74) *Attorney, Agent, or Firm*—Nixon Peabody LLP

(57) ABSTRACT

An application allows the user to monitor the status of groups of wireless modems employed in the field. The requests are sent out to multiple modems and responses return from the modem units to the computer program. The information from the modem units is then displayed to the user at a personal computer.

26 Claims, 2 Drawing Sheets

SYSTEM AND METHOD FOR REMOTELY MONITORING MODEM STATUS

BACKGROUND OF THE INVENTION

The use of modems for data communication over a cellular network is becoming more and more popular. As people use personal digital systems (PDA), portable laptops, and other systems, they desire to send data from these systems across the cellular network. One way of implementing these systems is to use a modem unit associated with each of these host processor units. When a company owns a large number of mobile units, it can be difficult to keep track of the status of these mobile units. For this reason it is desired for a user at a central location to obtain status information for a number of mobile units in the field.

SUMMARY OF THE INVENTION

The present invention is a system in which a computer is operably connected to the network. The network has software adapted to track the status of multiple modem units. The software allows for the production of status checks to be sent to the multiple modem units. The modem units are adapted to receive status check messages across the cellular network. The modem units are associated with host processors. The modem units reply with status information without being controlled by the host processors. Using this method, a user at a terminal can determine the status and general location of a number of modem units. In a preferred embodiment, the computer sends out a status request which goes through the network and is transmitted across the cellular network to each of the modem units. The modem units receive the status checks and then produce status information to be sent across the cellular network back to the original computer. In a preferred embodiment, the status check and information are sent in User Datagram Protocol (UDP) packets so that the modem units themselves do not need to implement a full Transmission Control Protocol/Internet Protocol (TCP/IP) stack. The modem checks are done by using the connectionless UDP standard.

In a preferred embodiment, the computer is connected across the Internet to a server. The server is connected to a cellular network to send the status checks to the modem units and receive modem information from the modem units.

Being able to track more than one modem unit at a central location is quite useful for large companies that have a number of modem units in the field. Additionally, since the modem unit can respond without being instructed by the host processor, the modem units associated with a variety of types of host processors can be tracked. The modem units do not require the host processor itself be turned on at a given time in order to respond.

BRIEF DESCRIPTION OF THE DRAWING FIGURES

FIG. 4 illustrates a UDP packet containing modem status data which can be sent to the computer program in one embodiment of the present invention.

DETAILED DESCRIPTION OF THE INVENTION

Figure 1:
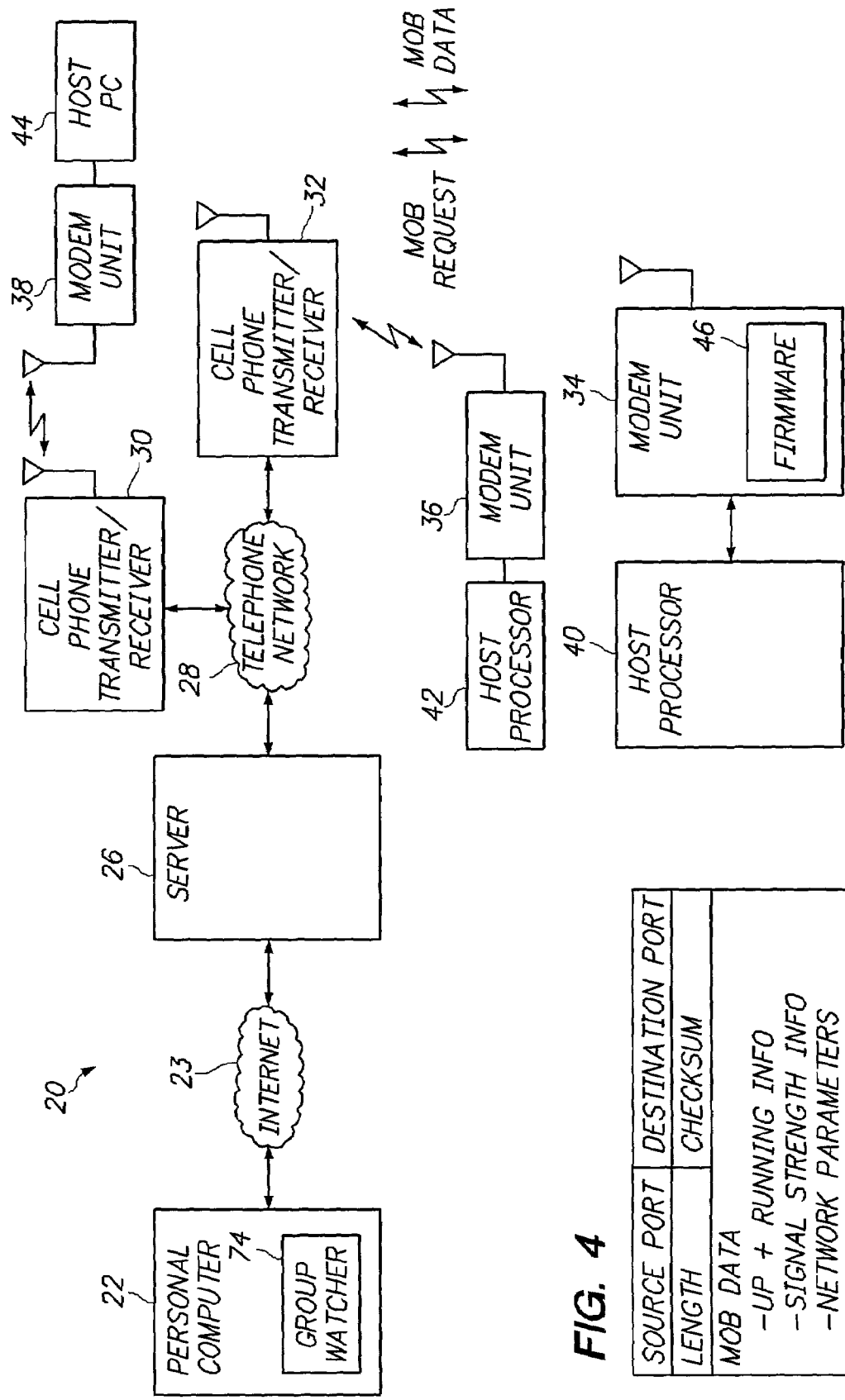
FIG. 1 is a diagram illustrating the system of the present invention.

FIG. 1 illustrates System 20 of the present invention. System 20 includes a computer 22 with a software program 24. The software program 24 is used to keep track of multiple modem units. The computer 22 is connected across the Internet 23 to server 26. The server 26 is connected across telephone network 28 to cell phone transmitters 30 and 32. Note that a variety of cell phone transmitters can be connected in the system of the present invention. Cell phone transmitters 22 are in wireless communication with modem units 34, 36 and 38. Modem units 34, 36 and 38 are associated with host processors 40, 42 and 44.

In the system of the present invention, program 24 loaded on the personal computer 22 allows for the production of modem status requests, which are sent across the cellular network to the modem units 34, 36 and 38. These requests preferably indicate the addresses for the host processors from which status information is to be obtained. The modem units 34 includes firmware 46, which allows it to detect the modem requests as being identified for that modem and to construct modem status signals, which can be transmitted by the modem unit 34 back to the cell phone transmitter.

In one embodiment, the server 26 is used to filter the request at the program 24 at the personal computer. Thus, only those authorized requests are transmitted across the cellular network. In one embodiment, server 26 filters the responses and make sure that only the status data that are authorized are sent to the Group Watcher program 24 at the personal computer 22. Alternately, this information-filtering function is done by a cell phone network.

Figure 2:
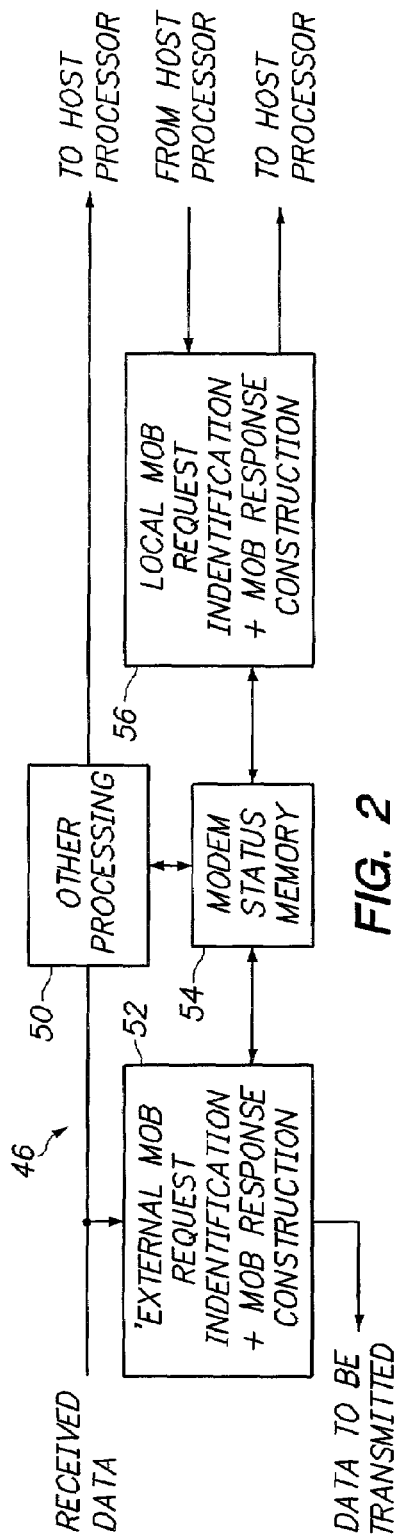
FIG. 2 is a diagram illustrating one embodiment of firmware for a modem unit of the present invention.

FIG. 2 illustrates one example of firmware 46 primed for use in the modem units of the present invention. In this system, the received data is processed in unit 50 and sent to the host processor. A unit 52 checks for an external status modem object (MOB) request and does identification to make sure this external MOB request identifies the host modem unit. If it does, an MOB response is constructed using data stored in the modem status memory 54. Thus, the modem unit 34 can identify modem status requests and produce modem status information signals to be sent out to the cell phone receiver and thus back to the computer program running on the personal computer. Status information can include up and running information, signal strength information, network parameters and cell ID information. Note that the same modem status memory 54 can be used to construct local MOB responses in using unit 56. The local requests or MOB requests are requests from the host processor. MOB is one example of a modem status protocol, but other protocols can also be used. Note that the production of the status responses to be sent to the cell phone units do not require control by the host processor, but are done in the modem unit. This allows modem status to be sent when the host processor is turned off and the status response does not depend upon the host processor, so that the different varieties of host processors will not interfere with the production of the modem status information that is sent to the central computer.

Figure 3:
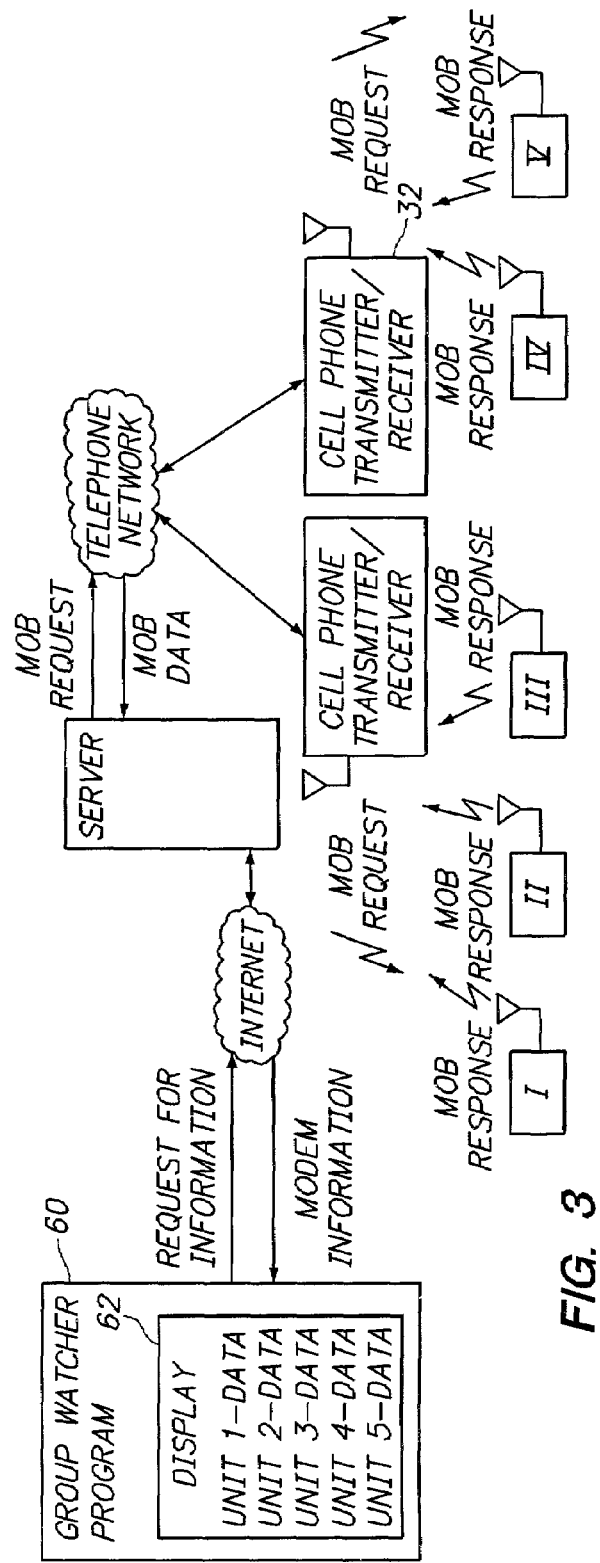
FIG. 3 illustrates one diagram of a system emphasizing a Group Watcher program at a computer.

FIG. 3 illustrates a multiple modem status program 60. In this case this program 60 includes a display 62 constructed using the modem status information. The modem status is a variety of modem units. Note that in this case five modem units associated with different cell phone transmitter receivers receive the request and respond to the modem status request with the status information. This status information is collected at the program 60 and displayed in display 62.

FIG. 4 illustrates a UDP packet for one embodiment of the present invention, wherein the modem data is stored in the UDP packet. By using a UDP packet, a full TCP/IP stack at the modem unit need not be provided. The connectionless UDP service simplifies the receiving of the status request, and the production of the status information by the modem unit, by running the UDP protocol over IP, avoids the more computational complex requirements of the TCP protocol.

Details of one embodiment of a system of the present invention are shown in Appendix I attached hereto.

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

What is claimed is:

1. A system comprising:
   a computer operably connected to a network, the computer having software configured to track the status of multiple modem units, the software allowing for the production of status check requests to be sent to the multiple modem units; and
   modem units for portable devices, configured to receive external status check requests from the computer, each of the modem units being associated with a host processor of the respective portable device, the modem unit being configured to reply with modem status information in response to the external status check request without being controlled by the host processor in the portable device.

2. The system of claim 1 wherein the computer is connected by the Internet to a server.

3. The system of claim 2 wherein the server is connected to a cellular network.

4. The system of claim 3 wherein the computer system sends requests across the network through the server, across the cellular network to the individual modem units.

5. The system of claim 4 wherein the modem units receive the requests and transmit status information back across the cellular network to the computer.

6. The system of claim 1 wherein the modem units transmit across a cellular network.

7. The system of claim 1 wherein the modem units run the UDP protocol over IP.

8. The system of claim 7 wherein the modem units do not have a TCP stack at the modem unit.

9. A computer configured to track the status of multiple modem units, said computer producing status check requests to be sent to multiple modem units for portable devices, the computer being configured to receive modem status information from the multiple modem units, the modem status information being produced by modem units in response to the status check request without being controlled by host processors of the respective portable devices associated with the modem units.

10. The computer of claim 9 wherein the computer is connected by the Internet to a server.

11. The computer of claim 10 wherein the server is connected to a cellular network.

12. The computer of claim 9 wherein the modem units are configured to be connected across a cellular network.

13. The computer of claim 12 wherein the requests are sent from the computer across the cellular network to the modem unit and the status information is sent from the modem unit across the cellular network to the computer.

14. The computer of claim 9 wherein the status information is produced by the modem units using UDP over IP stack.

15. The computer of claim 14 wherein the modem units do not use a TCP stack to produce the status information response.

16. A method comprising:
    transmitting modem status requests to modem units for portable devices across cellular network, each of the modem units being associated with a host processor of the corresponding portable device;
    at each modem unit, determining whether the status request is for that modem unit and, if so, constructing a modem status response and transmitting a wireless response from modem unit without being controlled by the host processor; and
    receiving modem status responses from a number of modem units and producing a display for a group of modem units.

17. The method of claim 16 wherein the modem status requests are transmitted to the modem units across the cellular network.

18. The method of claim 16 wherein the modem status requests are sent from a computer to the modem units.

19. The method of claim 18 wherein the computer is connected by the Internet to a server.

20. The method of claim 16 wherein at the modem unit a UDP over IP stack is implemented to interpret the modem status requests and to produce the modem status responses.

21. The method of the claim 20 wherein the modem units do not have a TCP stack at the modem unit to produce the modem status responses.

22. The system of claim 1 wherein the modem status information comprises at least one of:
    up and running information;
    signal strength information;
    network parameters; and
    modem unit identification information.

23. The computer of claim 9 wherein the modem status information comprises at least one of:
    up and running information;
    signal strength information;
    network parameters; and modem unit identification information.

24. The method of claim 16 wherein the modem status information comprises at least one of:
    up and running information;
    signal strength information;
    network parameters; and
    modem unit identification information.

25. The system of claim 1, wherein each of said modem units is further configured to reply to the host processor with modem status information, in response to a local status check request from the host processor.

26. The system of claim 1, wherein each of said modem units includes:
    a modem status memory.

* * * * *

UNITED STATES PATENT AND TRADEMARK OFFICE
CERTIFICATE OF CORRECTION

PATENT NO.      : 7,600,013 B2                                Page 1 of 1
APPLICATION NO. : 09/919069
DATED           : October 6, 2009
INVENTOR(S)     : Richard Wodzianek It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 960 days.

Signed and Sealed this

Fifth Day of October, 2010

David J. Kappos
*Director of the United States Patent and Trademark Office*